United States Patent
Lim et al.

(10) Patent No.: US 8,792,830 B2
(45) Date of Patent: Jul. 29, 2014

(54) METHOD AND APPARATUS FOR CARRIER AGGREGATION IN WIRELESS COMMUNICATION SYSTEM

(75) Inventors: Suhwan Lim, Gyeonggi-do (KR); Manyoung Jung, Gyeonggi-do (KR); Yoonoh Yang, Gyeonggi-do (KR); Sangwook Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/823,670

(22) PCT Filed: Jul. 6, 2011

(86) PCT No.: PCT/KR2011/004932
§ 371 (c)(1),
(2), (4) Date: Mar. 14, 2013

(87) PCT Pub. No.: WO2012/039541
PCT Pub. Date: Mar. 29, 2012

(65) Prior Publication Data
US 2013/0177091 A1 Jul. 11, 2013

Related U.S. Application Data (60) Provisional application No. 61/384,326, filed on Sep. 20, 2010.

(30) Foreign Application Priority Data

Feb. 23, 2011 (KR) .................. 10-2011-0016200

(51) Int. Cl.
*H04B 1/44* (2006.01)
(52) U.S. Cl.
USPC .............................. 455/59; 455/103; 375/260

(58) Field of Classification Search
USPC ............... 455/422.1, 423, 424, 59, 60, 67.11, 455/101, 103, 115.1, 226.1; 375/260, 261
See application file for complete search history.

(56) References Cited

U.S. PATENT DOCUMENTS

| | | | |
|---|---|---|---|
| 6,687,307 B1 * | 2/2004 | Anikhindi et al. | 375/260 |
| 7,418,047 B2 * | 8/2008 | Tanaka et al. | 375/260 |
| 8,446,973 B2 * | 5/2013 | Murakami et al. | 455/59 |
| 2009/0022231 A1 * | 1/2009 | Ochiai et al. | 455/59 |
| 2010/0210272 A1 | 8/2010 | Sundstrom et al. | |

FOREIGN PATENT DOCUMENTS

| | | |
|---|---|---|
| KR | 1020100020900 | 2/2010 |
| KR | 1020100089011 | 8/2010 |

OTHER PUBLICATIONS

PCT International Application No. PCT/KR2011/004932, Written Opinion of the International Searching Authority, or Declaration dated Feb. 6, 2012, 9 pages.

* cited by examiner

*Primary Examiner* — Thanh Le
(74) *Attorney, Agent, or Firm* — Lee, Hong, Degerman, Kang & Waimey (57) ABSTRACT

A carrier aggregation method in a wireless communication system and a corresponding apparatus, the method including using one baseband including two information and two radio frequency (RF) chains for aggregation of two component carriers at first and second frequency bands for each antenna port, switching the one baseband to at least one RF chain corresponding to the component carrier characteristic of the two RF chains upon use of the first frequency band, and transmitting a signal through the switched at least one RF chain.

14 Claims, 8 Drawing Sheets

FIG. 1

Prior Art

METHOD AND APPARATUS FOR CARRIER AGGREGATION IN WIRELESS COMMUNICATION SYSTEM

CROSS-REFERENCE TO RELATED APPLICATIONS

This application is the National Stage filing under 35 U.S.C. 371 of International Application No. PCT/KR2011/004932, filed on Jul. 6, 2011, which claims the benefit of earlier filing date and right of priority to Korean Patent Application No. 10-2011-0016200, filed on Feb. 23, 2011, and also claims the benefit of U.S. Provisional Application Ser. No. 61/384,326, filed on Sep. 20, 2010, the contents of which are all hereby incorporated by reference herein in their entirety.

TECHNICAL FIELD

The present disclosure relates to a carrier aggregation method, and more particularly, a method and apparatus for aggregating carriers in a wireless communication system using a multiple antenna, applicable regardless of an intra-band or inter-band.

BACKGROUND ART

One of systems regarded after the three generation wireless communication systems is an Orthogonal Frequency Division Multiplexing (OFDM) system, which is capable of avoiding an inter-symbol interference as much as possible by virtue of low complexity.

The OFDM system is configured to convert serially input data into N parallel data and transmit the N parallel data by loading on N orthogonal subcarriers. The subcarrier maintains orthogonality at the level of frequencies. An Orthogonal Frequency Division Multiple Access (OFDMA) denotes a multiple access technology that the multiple access is embodied by independently providing some of available subcarriers to each user in a system employing the OFDM modulation method.

A technology, which is the most widely used among technologies capable of increasing capacities in connection with the OFDM, is MIMO. The MIMO is a short term of Multi Input and Multi Output, and indicates an algorithm for improving data transmission and reception efficiency by adapting a multiple transmit antenna and a multiple receive antenna, breaking with an algorithm using one transmit antenna and one receive antenna. That is, the MIMO technology is to implement capacity increase and performance improvement by using multiple antennas at a transmitting end (transmitter) or a receiving end (receiver) in a wireless communication system. Here, MIMO is also referred to a multiple antenna (multi-antenna).

Summarizing the aforementioned, a multi-antenna technology adapts a technology of aggregating data segments received via various antennas, without being dependent on a single antenna route, in order to receive one entire message. The multi-antenna technology can improve data rate within a specific range or increase a system range for a specific data rate, accordingly, it is an attractive next generation mobile communication technology, which can be broadly used for mobile communication terminals, relays and the like, namely, expected to overcome throughput limit of mobile communications, which has reached the limitation due to data communication extension or the like.

3GPP and IEEE 802.11 are undergoing a standardization task for a terminal, which can support not only the MIMO system but also a carrier aggregation (CA), by which more data can be transmitted to a terminal (or User Equipment (UE)) using different types of carriers. This aims to supporting wider bandwidths up to 100 MHz compared to the conventional LTE rel(release)-8. Hereinafter, a terminal is referred to as UE.

In general, a UE architecture is defined by basically regarding an intra-band CA which transmits data by aggregating carriers using a contiguous spectrum is basically regarded. However, the UE architecture is defined such that data for one UE can be transmitted even using a non-contiguous spectrum to the extent permitted by UE complexity. However, a UE baseband supporting an intra-band or inter-band as well as the MIMO system has an extremely complex architecture, which causes a problem that the UE capabilities should be considered when desiring to categorize such UEs according to frequency bands.

Consequently, UEs supporting the intra-band CA and UEs supporting the inter-band CA have been separately produced for the intra-band and the inter-band, respectively, which causes inefficiency in terms of using UEs. Hence, a single UE baseband architecture for supporting not only the intra-band but also the inter-band CA is required.

DISCLOSURE OF INVENTION

Solution to Problem

Therefore, an aspect of the detailed description is to provide a method and apparatus for carrier aggregation in a wireless communication system using a multiple antenna, applicable regardless of an intra-band or inter-band.

To achieve these and other advantages and in accordance with the purpose of the present invention, as embodied and broadly described herein, there is provided a carrier aggregation method in a wireless communication system including using one baseband including two information and two Radio Frequency (RF) chains for aggregation of two component carriers at first and second frequency bands for each antenna port, switching the one baseband to at least one RF chain corresponding to the component carrier characteristic of the two RF chains upon use of the first frequency band and transmitting a signal through the switched at least one RF chain.

The first frequency band may be an intra-band and the second frequency band may be an inter-band. The two component carriers may be all present at the first frequency band, respectively present at the first and second frequency bands, or all present at the second frequency band.

The one baseband may use an oversampling and one Inverse High Fourier Transform (IFFT) block. The one baseband may be configured to add a Cyclic Prefix (CP) to an output signal of the one IFFT block and separate signals passed through a mixer and a low pass filter into paths as many as the number of the component carriers to be transmitted to the RF chains.

In accordance with another exemplary embodiment, a carrier aggregation method in a wireless communication system may include using a first baseband, a second baseband, a first Radio Frequency (RF) chain and a second RF chain for aggregation of two component carriers at first and second frequency bands for each antenna port, switching one baseband including combined information of information related to the second frequency band and information related to the first baseband to at least one RF chain corresponding to the component carrier characteristic of the first and second RF chains and transmitting a signal through the switched at least one RF chain.

The first frequency band may be an intra-band and the second frequency band may be an inter-band. The two component carriers may be all present at the first frequency band, respectively present at the first and second frequency bands, or all present at the second frequency band.

Upon using the first frequency band, the first baseband may use an oversampling and one Inverse High Fourier Transform (IFFT) to process a signal that the information related to the first baseband and the information related to the second baseband are combined, or upon using the second frequency band, IFFT blocks as many as the number of basebands may be used to process information related to each baseband.

The IFFT blocks may include a first IFFT block and a second IFFT block. Upon using the first frequency band, only the first IFFT block may be used to process the signal that the information related to the first baseband and the information related to the second baseband are combined, and upon using the second frequency band, both the first and second IFFT blocks may be used. The first IFFT block may be larger than the second IFFT block.

In accordance with an exemplary embodiment, a carrier aggregation method in a wireless communication system may include using a first baseband, a second baseband, a first radio frequency (RF) chain and a second RF chain for aggregation of two component carriers at first and second frequency bands for each antenna port, selecting the first frequency band or the second frequency band to transform a baseband architecture according to the selected frequency band, switching the transformed baseband to at least one RF chain corresponding to the component carrier characteristic of the first and second RF chains and transmitting a signal through the switched at least one RF chain.

Advantageous Effects of Invention

In a carrier aggregation method and apparatus according to the exemplary embodiments, when transmitting data using a carrier aggregation in a wireless communication system, such as LTE-Advanced, IEEE 802.11 WLAN or the like, such data can efficiently be processed regardless of an intra-band or inter-band.

MODE FOR THE INVENTION

Reference will now be made in detail to the preferred embodiments of the present invention, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. Term 'and/or' may represent a combination of a plurality of related disclosed items or any of the plurality of related disclosed items.

It will be understood that when an element is referred to as being "connected with" another element, the element can be directly connected with the other element or intervening elements may also be present. In contrast, when an element is referred to as being "directly connected with" another element, there are no intervening elements present.

Technical terms used in this specification are used to merely illustrate specific embodiments, and should be understood that they are not intended to limit the present disclosure. A singular representation may include a plural representation as far as it represents a definitely different meaning from the context. Terms 'include' or 'has' used herein should be understood that they are intended to indicate an existence of features, numbers, steps, operations or components or a combination thereof, disclosed in the specification, and it may also be understood that an existence of other features, numbers, steps, operations or components or a combination thereof or probability of addition thereof should not be excluded in advance.

As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning.

Embodiments of the present disclosure will be described below in detail with reference to the accompanying drawings where those components are rendered the same reference number that are the same or are in correspondence, regardless of the figure number, and redundant explanations are omitted.

This specification relates to a UE baseband architecture, which is efficiently applicable regardless of an inter- or intra-band carrier when transmitting data using a carrier aggregation (CA) in the LTE-advanced system, IEEE 802.11 WRAN or the like using a multiple antenna.

LTE-advanced and 4G mobile communication are developing, as a technology having the most significant feature, a carrier aggregation (CA) which is capable of efficiently transmitting more data by aggregating every frequency resource irrespective of carriers with frequencies distant from each other. However, when a frequency for CA is an intra-band, the UE architecture using a multiple antenna has been allowed to transmit and receive data of a plurality of carriers using one baseband and one RF chain for each antenna port. However, for considering an inter-band, the UE architecture using the multiple antenna has been allowed to transmit and receive data by employing different basebands and parallel RF chains for respective carriers.

Hence, this specification proposes two UE baseband architectures that effectively support not only the intra-band CA but also the inter-band CA. These architectures may be allowed to support not only the intra-band but also the inter-band CA with a single UE, other than the UE architecture independently supporting the intra- or inter-band CA, and also efficiently reduce a computational amount.

The first UE baseband architecture proposed efficiently supports an inter-band CA by using a single IFFT block and accordingly reduce a computational amount, unlike the existing UE baseband architecture that requires IFFT blocks as many as the number of component carriers, which are increased as the number of component carriers of an inter-band CA is increases.

Also, in the first UE baseband architecture, an RF chain suitable for each frequency of the supported component carriers can be effectively selected and used, and such architecture can exist in plurality for supporting MIMO.

The second proposed UE baseband architecture may be configured to determine whether to support CA using one large IFFT block or two or more IFFT blocks depending on an intra- or inter-band CA prior to the IFFT block, and thereafter use a supportable RF chain for each component carrier.

This UE baseband architecture may further increase an oversampling rate, as compared to a baseband architecture supporting the existing OFDM system, by designing one IFFT block to be as large as being able to support an intra-band CA. However, the second UE baseband architecture may not be an architecture capable of reducing the computational amount more than the first architecture, due to an increase in the number of IFFT blocks in response to an increase in the number of component carriers supporting the inter-band CA. The second UE baseband architecture may nevertheless have an advantage of supporting not only the intra-band CA but also the inter-band CA simply by a single architecture.

Figure 1:
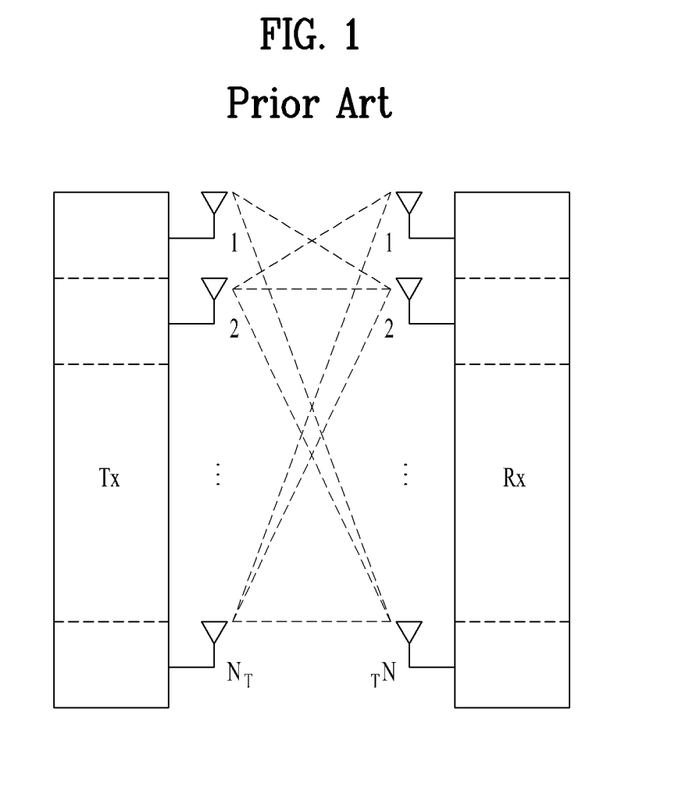
FIG. 1 illustrates an antenna structure of a typical multiple antenna system according to the related art.

FIG. 1 illustrates an antenna configuration of a typical multiple antenna system according to related art.

As illustrated in FIG. 1, if the number of transmit antennas and the number of receive antennas are simultaneously increased up to $N_T$ and $N_R$, respectively, a channel transmission capacity is theoretically increased in proportion to the number of antennas, unlike the case of using plural antennas only at a transmitter or receiver, which results in improvement of a transfer rate and remarkable improvement of frequency efficiency.

The transfer rate according to the increase in the channel transmission capacity may be theoretically increased as high as a value obtained by multiplying an increase rate of the number of antennas $R_i$ by a maximum transfer rate $R_o$ when a single antenna is used. That is, in a MIMO communication system using four transmit antennas and four receive antennas, a transfer rate, which is four times higher than that in a single antenna system may be theoretically obtained.

Since the theoretical capacity increase in the multiple antenna system was proved in the middle of the 1990s, various technologies for introducing this into substantial improvement of a data transfer rate have been actively in progress so far. Some of those technologies are reflected in standards of various wireless communications such as the 3G mobile communications, the next generation WLAN and the like.

$$R_i = \min(N_r, N_R) \quad \text{[Equation 1]}$$

In regard of the trend of researches on the multiple antenna carried out until now, active researches have been carried out in various terms, such as researches in view of an information theory related to computation of multi-antenna communication capacity under various channel environments and multiple access environments, researches on wireless (radio) channel measurements and modeling in a multiple antenna system, researches on a space-time signal processing for improvement of transmission reliability and transfer rate, and the like.

In a UE architecture having a typical MIMO channel environment, an incoming signal of each receive antenna may be expressed by the following equation.

$$y = \begin{bmatrix} y_1 \\ y_2 \\ \vdots \\ y_i \\ \vdots \\ y_{N_2} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_21} & h_{N_22} & \cdots & h_{N_2N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_2} \end{bmatrix} = \quad \text{[Equation 2]}$$

$$Hx + n$$

Here, each channel between a transmit antenna and a receive antenna may be categorized according to a transmit and receive antenna index. A channel from a transmit antenna j to a receive antenna i is indicated by $h_{ij}$. In case of using a precoding scheme, as used in LTE, upon transmission, an outgoing signal x may be expressed by Equation 3.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 3]}$$

$$W\hat{s} = WPs$$

where $w_{ij}$ of a precoding matrix W denotes a weight value between the $i^{th}$ transmit antenna and the $j^{th}$ information. Here, if it is assumed that transmission power of each outgoing signal are $P_1, P_2, \ldots, P_{N_T}$, transmission information with an adjusted transmission power may be expressed by the following diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A Carrier Aggregation (CA) is a technology for aggregating two or more component carriers (CCs) and in introduced in the LTE-Advanced (LTE-A) for supporting a transmission bandwidth up to 100 MHz and spectrum aggregation. To this end, an LTE-A UE may be allowed to simultaneously transmit and receive a plurality of CCs depending on its capabilities.

The CCs may be located contiguously or non-contiguously on a frequency axis. For the latter, it is referred to as a spectrum aggregation, and the CA is comprehensively understood as aggregation of contiguous or non-contiguous band signals. Difficulty in implementing aggregation of non-contiguous spectrum slivers may depend on a position of each spectrum sliver and an entire bandwidth required.

Figure 2:
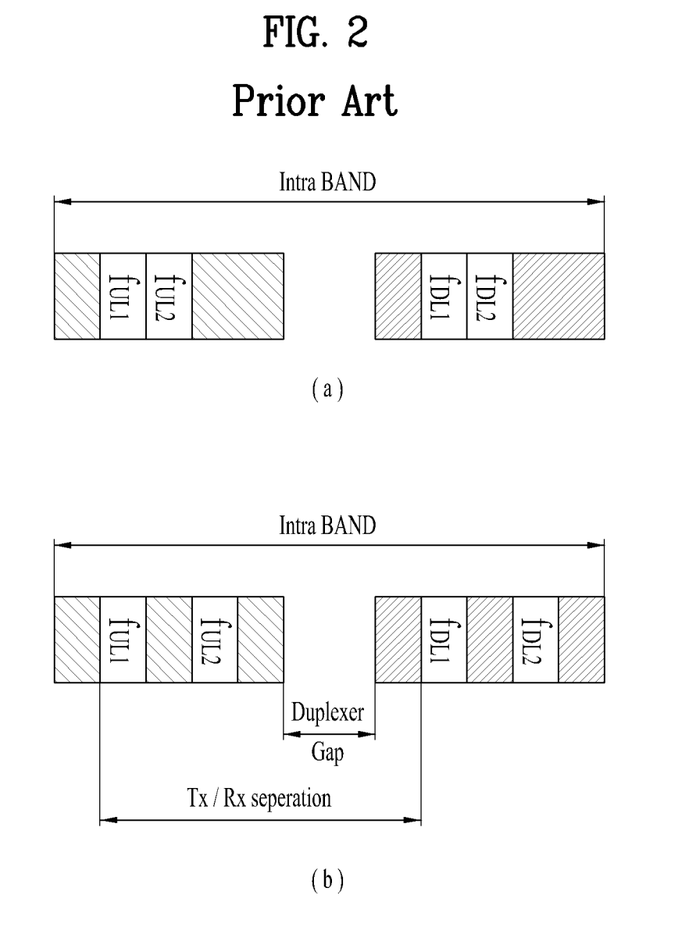
FIG. 2 illustrates an intra-band carrier aggregation according to the related art.

FIG. 2 illustrates an intra-band CA according to the related art. FIG. 2A illustrates an intra-band contiguous CA, and FIG. 2B illustrates an intra-band non-contiguous CA.

An LTE-Advanced (LTE-A) adapts various schemes including uplink MIMO and CA to implement a high-speed radio transmission. The CAs discussed in the LTE-A may be divided into the intra-band contiguous CA illustrated in FIG. 2A, and the intra-band non-contiguous CA illustrated in FIG. 2B.

Figure 3:
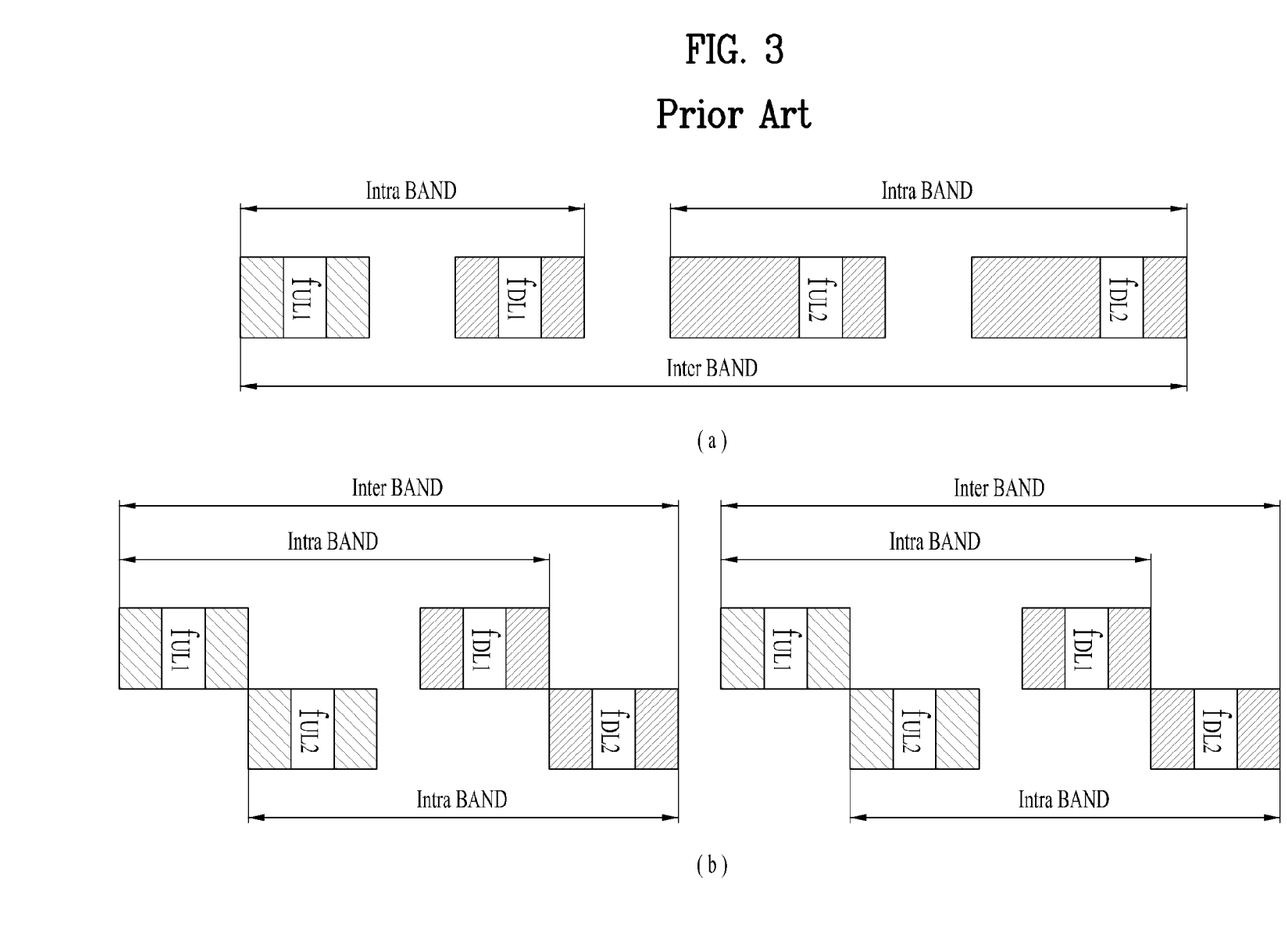
FIG. 3 illustrates an inter-band carrier aggregation according to the related art.

FIG. 3 is an overview of an inter-band CA according to the related art. FIG. 3A illustrates a combination of a low band and a high band for the inter-band CA, and FIG. 3B illustrates a combination of similar frequency bands for the inter-band CA.

That is, the inter-band CA of FIG. 3 may be divided into an inter-band CA among low-band carriers and high-band carriers, which have different Radio Frequency (RF) characteristics, as illustrated in FIG. 3A, and an inter-band CA of similar frequencies, which have similar RF characteristics and thus can use a common RF terminal for each component carrier, as illustrated in FIG. 3B.

TABLE 1

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[Note 1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 Hz | FDD |
| 10 | 1710 MHz-1770 MHz | 2110 MHz-2170 MHz | FDD |
| 11 | 1427.9 MHz-1447.9 Hz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz 862 MHz | 791 MHz 821 MHz | FDD |
| 21 | 1447.9 MHz 1462.9 Hz | 1495.9 MHz 1510.9 Hz | FDD |
| 22 | [3410] MHz [3500] Hz | [3510] MHz [3600] MHz | FDD |
| ... | | | |

Note [1] Band 6 is not applicable.

Table 1 shows operating frequency bands defined in 3GPP TS36.101, and based on those operating bands, the four types of CA cases of FIGS. 2 and 3 are categorized.

A UE in LTE-A or 802.11 VHT basically supports the MIMO technology, and is capable of obtaining an extremely high data rate by virtue of use of a broadband frequency by the CA. However, an architecture of a UE which supports both the CA and the MIMO system is very complicated, and also the CA and the MIMO system can be supported in different manners in the UE architecture.

That is, in order to support the existing MIMO, RF chains must be individually present in correspondence with the number of layers. To support the CA in this architecture, the supporting schemes may be divided into an intra-band contiguous CA supporting scheme and an inter-band non-contiguous CA supporting scheme according to frequencies belonging to each operator.

Figure 4:
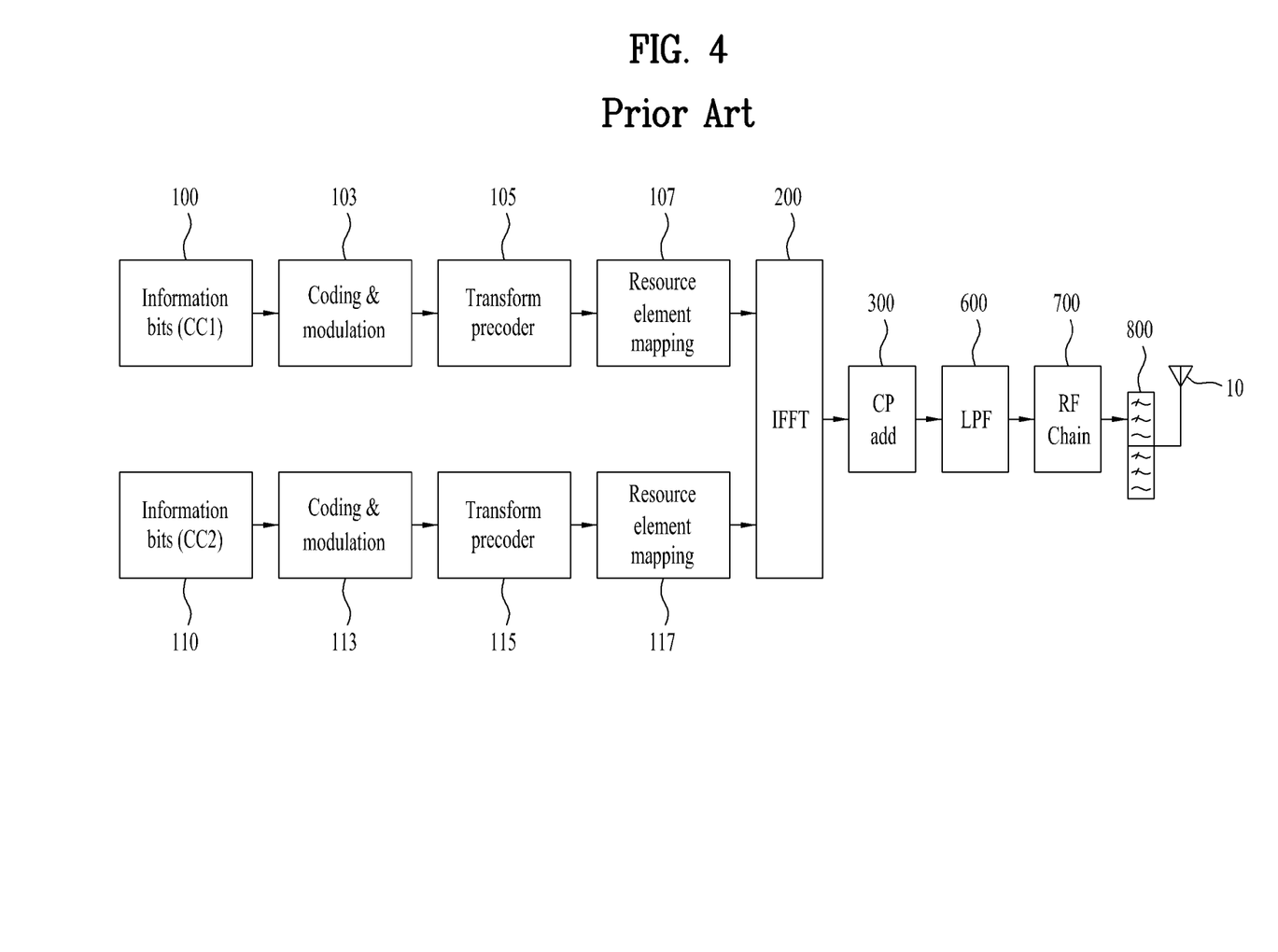
FIG. 4 is a block diagram showing a UE baseband architecture for an intra-band carrier aggregation according to the related art.
Figure 5:
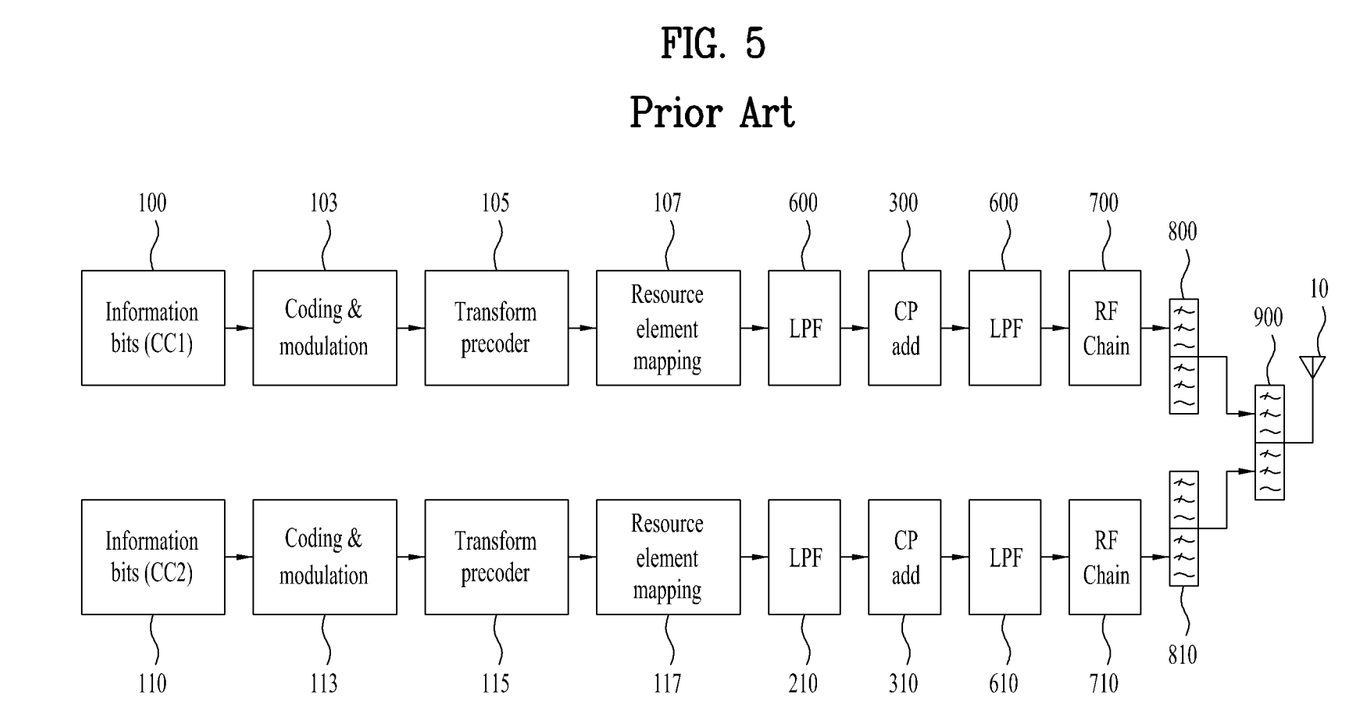
FIG. 5 is a block diagram showing a UE baseband architecture for an inter-band carrier aggregation according to the related art.

FIG. 4 is a block diagram showing a UE baseband architecture for an intra-band carrier aggregation according to the related art, and FIG. 5 is a block diagram showing a UE baseband architecture for an inter-band carrier aggregation according to the related art. FIGS. 4 and 5 illustrate a baseband transmitter of the UE supporting a typical CA. The architecture may be provided as many as the number of antennas, aligned in parallel, in a system supporting MIMO.

A baseband unit of the UE in FIG. 4 may include information bit blocks 100, 110, coding and modulation blocks 103, 113, transform precoders 105, 115, resource element mapping blocks 107, 117, an IFFT block 200, a CP adder 300 and a low pass filter (LPF) 600. An RF unit of the UE in FIG. 4 may include an RF chain 700, a duplexer 800, a diplexer and an antenna 10 and the like.

As shown in FIG. 4, if a communication system using a general OFDM modulation scheme supports an intra-band CA using contiguous frequencies, OFDM modulation/demodulation may be carried out by one FFT/IFFT 700, accordingly, the single RF chain 700 may be allowed to process aggregated frequency bands. Here, the duplexers 800 of the intra-band may serve to distinguish Tx (UE_UL) and RX (UE_DL) from each other.

A baseband unit of the UE in FIG. 5 may include information bit blocks 100, 110, coding and modulation blocks 103, 113, transform precoders 105, 115, resource element mapping blocks 107, 117, IFFT blocks 210, CP adders 300 and low pass filters (LPFs) 600, 610. An RF unit of the UE in FIG. 5 may include RF chains 700, 710, duplexers 800, 810, a diplexer 900, an antenna 10 and the like.

As shown in FIG. 5, upon supporting the inter-band CA, different basebands and the RF chains 700, 710 are required with respect to the minimum component carriers (CCs) 100, 110 due to the limits to processing bandwidths of the basebands and the RF chains.

The duplexers 800, 810 of the inter-band shown in FIG. 5 may serve to distinguish Tx (UE_UL) and RX (UE_DL) of two bands from each other. The diplexer 900 in the inter-band may be used for discrimination of the component carrier CC1 100 and the component carrier 2 CC2 110.

For a UE baseband architecture supporting LTE-A and VHT in 3GPP and IEEE 802.11, the architectures of FIGS. 4 and 5 may be disposed in parallel as many as the number of maximum supportable multiple antennas.

However, UEs supporting the intra-band CA and UEs supporting the inter-band CA have been independently produced, as shown in FIGS. 4 and 5, due to the limitation of implementation. Also, a study on a single UE baseband architecture, which is capable of supporting not only the intra-band CA but also the inter-band CA, is not thoroughgoing enough. Therefore, a study on a base/RF architecture for CA in a MIMO environment is required.

Figure 6:
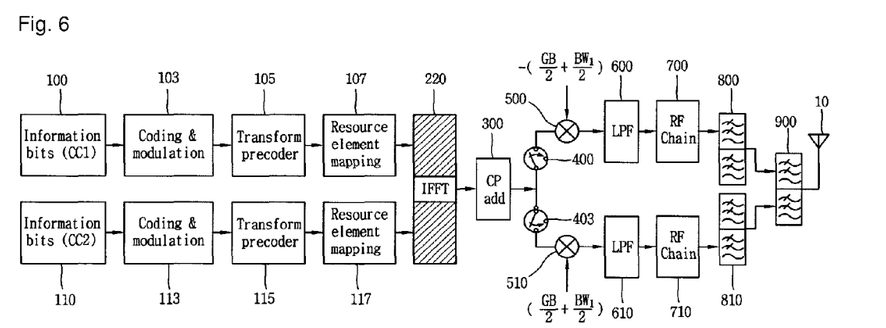
FIG. 6 is a block diagram showing a UE baseband architecture for an inter-/intra-band carrier aggregation in accordance with one exemplary embodiment.
Figure 7:
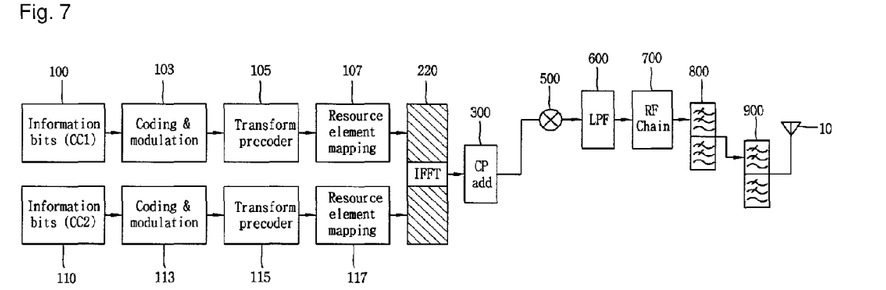
FIG. 7 is a block diagram showing a UE baseband architecture for an intra-band carrier aggregation in the UE baseband architecture for the intra-/inter-band carrier aggregation in accordance with the one exemplary embodiment.

FIG. 6 is a block diagram showing a UE baseband architecture for an inter-/intra-band carrier aggregation in accordance with one exemplary embodiment, and FIG. 7 is a block diagram showing a UE baseband architecture for an intra-band carrier aggregation in the UE baseband architecture for the intra-/inter-band carrier aggregation in accordance with the one exemplary embodiment.

A baseband unit of the UE in FIG. 6 may include information bit blocks 100, 110, coding and modulation blocks 103, 113, transform precoders 105, 115, resource element mapping blocks 107, 117, an IFFT block 220, a CP adder 300, switches 400, 403, mixers 500, 510 and low pass filters (LPFs) 600, 610. An RF unit of the UE in FIG. 6 may include RF chains 700, 710, duplexer 800, 810, a diplexer 900, an antenna 10 and the like.

FIG. 6 illustrates the UE baseband architecture which can also support the intra-band CA based on the UE baseband architecture supporting the inter-band CA, namely, an integrated UE baseband architecture which can support not only the intra-band CA but also the inter-band CA.

A baseband unit of the UE in FIG. 7 may include information bit blocks 100, 110, coding and modulation blocks 103, 113, transform precoders 105, 115, resource element mapping blocks 107, 117, an IFFT block 220, a CP adder 300, switches 400, 403, mixers 500, 510 and low pass filters 600, 610. An RF unit of the UE in FIG. 7 may include RF chains 700, 710, duplexer 800, 810, a diplexer 900, an antenna 10 and the like.

In FIG. 7, when the UE supports the intra-band CA, the UE is allowed to activate only a path connected to the RF chain 700, which supports the intra-band desired to use, using the switch 400 after the CP adder 300. Here, power of the RF chain 710 connected to a deactivated path is blocked. Also, the UE may operate using both paths as shown in FIG. 6 under an environment supporting the inter-band CA.

The UE baseband architectures shown in FIGS. 6 and 7 need to carry out a comparison of a computational amount with the UE baseband architecture supporting the typical inter-band CA. This specification employs the UE baseband architecture having one large IFFT block other than the existing UE baseband architecture using a plurality of IFFT blocks.

However, in general, upon implementing a UE baseband architecture, it may be implemented using an oversampling for facilitation of filtering at an additional base band and an RF. Therefore, considering the oversampling of signals, the size of a used IFFT/FFT may not change, which results in more reduction of a computational amount by N log 2N as compared to the existing baseband architecture. Here, N denotes a size of a user IFFT/FFT.

If a computational amount of the additional mixers 500, 510 is M, the calculation of the computational amount may be simply implemented only by one complex multiplexer and simply expressed by Equation 5. Also, the low pass filters 600, 610 are needed even for the existing architecture for a channel filtering, and thus an additional increase in the computational amount caused due to the low pass filters is insignificant. The difference in the computational amount between the two architectures will be expressed as follows.

$$\text{Comparison of Computational Amount} = \text{Computational amount of inter-band CA for the existing UE architecture} - \text{Computational amount of inter-band CA for the proposed UE architecture} = 2M - 0(N \log_2 N)^* - 0(N \log_2 N) \quad \text{[Equation 5]}$$

Therefore, the efficient baseband/RF chain architecture based on the inter-band CA of this specification is a new UE baseband architecture, which uses a single IFFT block so as to remarkably reduce FFT complexity caused by multiple IFFT blocks and is able to support not only the intra-band CA but also the inter-band CA by such single architecture.

Figure 8:
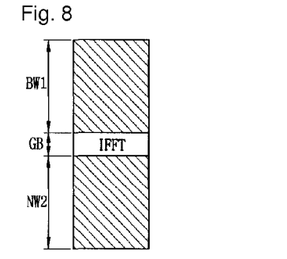
FIG. 8 illustrates a resource mapping at an Inverse Fast Fourier Transform (IFFT) block in accordance with the one exemplary embodiment.

FIG. 8 illustrates a resource mapping at an Inverse Fast Fourier Transform (IFFT) block in accordance with one exemplary embodiment. When the UE baseband architecture shown in FIGS. 6 and 7 is for the intra- or inter-band CA, in regard of a resource mapping at the IFFT block 220, as shown in FIG. 8, a signal of the component carrier CC1 of the information bit block 100 is mapped to bandwidth 1 BW1 and the component carrier 2 of the information bit block 110 to bandwidth 2 BW2, and the BW1 and BW2 should be spaced apart by a guard band GB. Here, the guard band GB may have an appropriately set region in consideration of the existing channel filtering for discrimination between the signals mapped to BW1 and BW2.

Figure 9:
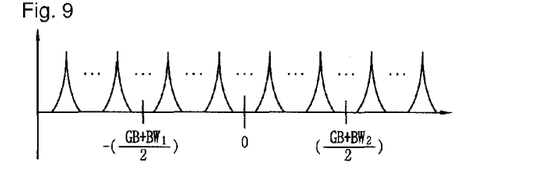
FIG. 9 illustrates a frequency shift after an IFFT block in accordance with the one exemplary embodiment.

FIG. 9 illustrates a frequency shift after the IFFT block in accordance with the one exemplary embodiment. In the UE baseband architecture shown in FIGS. 6 and 7, signals that the component carriers transferred through the IFFT block 220 are aggregated experience a frequency shift in right and left directions through the mixers 500 and 510 so as to situate a center frequency of each band signal on a position of 0.

Afterwards, each component carrier is separated by using the low pass filters 600 and 610, which allows passing of a frequency bandwidth (BW) of each component carrier (CC), and the distinguished component carriers are transferred (transmitted) through RF chains 700, 710 corresponding to the respective frequencies thereof.

Here, the low pass filters 600, 610 also function the existing channel filtering, and thus an additional increase in the complexity is insignificant. The signals passed through the RF chains then pass through the duplexer 800, 810 and the diplexer 900 to be transmitted through the antenna 10.

Here, the duplexers 800, 810 may serve to diverge (divide, separate) a transmitting end and a receiving end to obviate mixing of signals of the transmitting end and the receiving end upon using the same antenna 10. The diplexer 900 may serve to distinguish frequencies of the component carriers.

Figure 10:
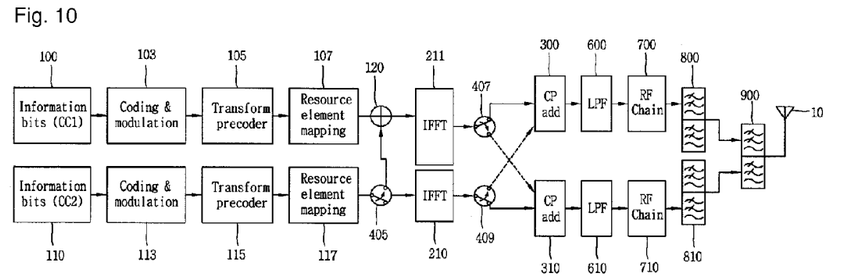
FIG. 10 is a block diagram showing a baseband architecture of UE for an inter-/intra-band carrier aggregation in accordance with another exemplary embodiment.
Figure 11:
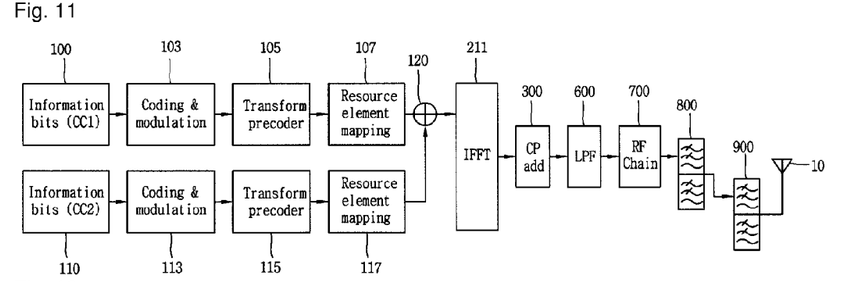
FIG. 11 is a block diagram showing a UE baseband architecture for an intra-band carrier aggregation in the UE baseband architecture for the intra-/inter-band carrier aggregation in accordance with the another exemplary embodiment.

FIG. 10 is a block diagram showing a baseband architecture of UE for an inter-/intra-band carrier aggregation in accordance with another exemplary embodiment, and FIG. 11 is a block diagram showing a UE baseband architecture for an intra-band carrier aggregation in the UE baseband architecture for the intra-/inter-band carrier aggregation in accordance with the another exemplary embodiment.

A baseband unit of the UE shown in FIG. 10 may include information bit blocks 100, 110, coding and modulation blocks 103, 113, transform precoders 105, 115, resource element mapping blocks 107, 117, a combiner 120, IFFT blocks 210, 211, a CP adder 300, switches 405, 407, 409 and low pass filters 600, 610. An RF unit of the UE shown in FIG. 10 may include RF chains 700, 710, duplexers 800, 810, a diplexer 900, an antenna 10 and the like.

FIG. 10 shows a UE baseband architecture different from that in FIG. 6. This single architecture supports an intra- or inter-band CA by using N IFFT blocks 210, 211.

As shown in FIG. 10, the UE baseband architecture may be designed such that the IFFT block 211 at the first baseband chain is two times larger than the IFFT block 210 at the second baseband chain. Accordingly, when supporting the intra-band CA, one IFFT block 211 can cover two or more components carriers CC1 and CC2 of the information bit blocks 100, 110.

Referring to FIG. 10, when the inter-band CA is supported, the multiple IFFT blocks 210, 211 may all be used. This architecture is similar to the existing UE baseband architecture supporting the inter-band CA shown in FIG. 5.

However, unlike the IFFT blocks in the UE architecture of FIG. 5, the IFFT blocks have different sizes so as to increase an oversampling rate, thereby enhancing resolution.

When comparing the computational amount in the transmission block diagram of the UE baseband architecture typically supporting only the inter-band CA as shown in FIG. 5 with the computational amount in the architecture of FIG. 10, the comparison result can be expressed as follows.

Comparison of Computational
Amount=Computational amount of inter-band
CA for the existing UE architecture−Computational amount of inter-band CA for the second-proposed UE architecture=0[(2*N)*log$_2$(2*N)]−0
[N*log$_2$N]  [Equation 6]

Therefore, the computational amount may further increase, simply as much as (2*N)*log$_2$(2*N)−N*log$_2$N, in response to the increase in the size of the IFFT block. The increased computational amount is insignificant in regard of the entire system. Also, considering the oversampling, there is no increase in the computational amount.

That is, in the architecture of FIG. 10, as the number of component carriers supporting the inter-band CA increases, the number of IFFT blocks increases as well, accordingly, more reduction of the computational amount is not derived as compared to the architecture of FIG. 6. The architecture of FIG. 10 can nevertheless support not only the intra-band CA but also the inter-band CA simply by a single architecture.

Also, when supporting the intra-band CA, the architecture of FIG. 10 can increase the oversampling rate more than the baseband architecture supporting the existing OFDM system.

A baseband unit of the UE in FIG. 11 may include information bit blocks 100, 110, coding and modulation blocks 103, 113, transform precoders 105, 115, resource element mapping blocks 107, 117, a combiner 120, IFFT blocks 210, 211, a CP adder 300, switches 405, 407, 409 and low pass filters 600, 610. An RF unit of the UE shown in FIG. 11 may include RF chains 700, 710, duplexers 800, 810, a diplexer 900, an antenna 10 and the like.

FIG. 11 shows the UE baseband architecture when supporting the intra-band CA in the architecture of FIG. 10. This UE baseband architecture uses the larger IFFT block 211 of the IFFT blocks 210, 211, and can support the intra-band CA by selecting an RF chain 700 which can support a corresponding operation frequency.

Figure 12:
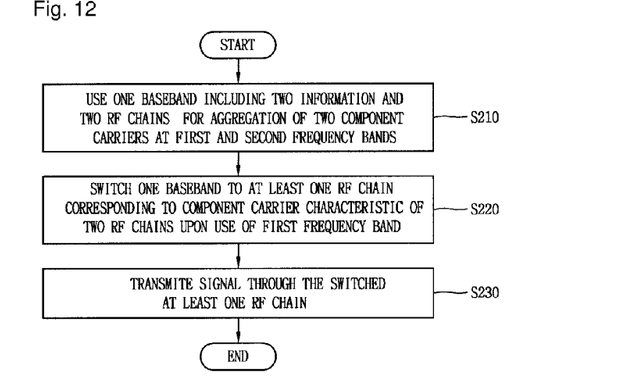
FIG. 12 is a flowchart showing the carrier aggregation method shown in FIG. 6.

FIG. 12 is a flowchart showing the carrier aggregation method shown in FIG. 6

The carrier aggregation method in a wireless communication system may include using one baseband including two information and two radio frequency (RF) chains for aggregation of two component carriers at first and second frequency bands for each antenna port (S210), switching the one baseband to at least one RF chain corresponding to the component carrier characteristic of the two RF chains upon use of the first frequency band (S220) and transmitting a signal through the switched at least one RF chain (S230).

Figure 13:
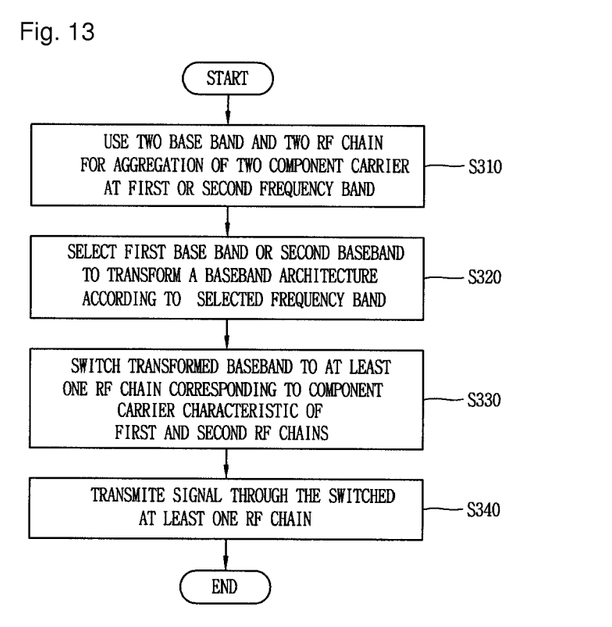
FIG. 13 is a flowchart showing the carrier aggregation method shown in FIG. 10.

FIG. 13 is a flowchart showing the carrier aggregation method shown in FIG. 10.

The carrier aggregation method in the wireless communication system may include using a first baseband, a second baseband, a first radio frequency (RF) chain and a second RF chain for aggregation of two component carriers at first and second frequency bands for each antenna port (S310), selecting the first frequency band or the second frequency band to transform a baseband architecture according to the selected frequency band (S320), switching the transformed baseband to at least one RF chain corresponding to the component carrier characteristic of the first and second RF chains (S330) and transmitting a signal through the switched at least one RF chain (S340).

Hereinafter, description will be given of a configuration and a function of a terminal (or UE) according to this specification.

The terminal described above may be referred to as a device, and include any terminal which is capable of implementing the exemplary embodiments illustrated in FIGS. 4 to 13. That is, the terminal described in this specification, namely, the device may comprehensively include mobile communication terminals (e.g., user equipment (UE), a mobile phone, a cellular phone, a DMB phone, a DVB-H phone, a PDA phone, a PTT phone and the like), digital TV, GPS navigator, portable game machine, MP3 and other home alliances.

Also, a terminal according to this specification may include software or a module having the software for implementing the exemplary embodiments of FIGS. 4 to 13. The module is one component and may be referred to as a processor or a controller. The terminal may include essential hardware and software components for executing the technical features of the present disclosure.

The method having described so far may be implemented by software, hardware or combination thereof. For example, the method may be stored in a storage medium (for example, an internal memory of a terminal, a flash memory, a hard disc, etc.), and implemented as codes or commands within a software program, which may be executed by a processor (for example, a microprocessor within the terminal).

The configurations and methods for the carrier aggregation in the wireless communication system in the aforesaid embodiments may not be limitedly applied, but such embodiments may be configured by a selective combination of all or part of each embodiment so as to derive many variations.

The invention claimed is:

1. A carrier aggregation method in a wireless communication system comprising:
    using one baseband including two information and two radio frequency (RF) chains for aggregation of two component carriers at first and second frequency bands for each antenna port;
    switching the one baseband to at least one RF chain corresponding to the component carrier characteristic of the two RF chains upon use of the first frequency band; and
    transmitting a signal through the switched at least one RF chain.

2. The method of claim 1, wherein the first frequency band is an intra-band and the second frequency band is an inter-band.

3. The method of claim 1, wherein the two component carriers are all present at the first frequency band, respectively present at the first and second frequency bands, or all present at the second frequency band.

4. The method of claim 1, wherein the one baseband uses an oversampling and one Inverse High Fourier Transform (IFFT) block.

5. The method of claim 4, wherein the one baseband is configured to add a Cyclic Prefix (CP) to an output signal of the one IFFT block and separate signals passed through a mixer and a low pass filter into paths as many as the number of the component carriers to be transmitted to the RF chains.

6. A carrier aggregation method in a wireless communication system comprising:
    using a first baseband, a second baseband, a first Radio Frequency (RF) chain and a second RF chain for aggregation of two component carriers at first and second frequency bands for each antenna port;
    switching one baseband including combined information of information related to the second frequency band and information related to the first baseband to at least one RF chain corresponding to the component carrier characteristic of the first and second RF chains; and
    transmitting a signal through the switched at least one RF chain.

7. The method of claim 6, wherein the first frequency band is an intra-band and the second frequency band is an inter-band.

8. The method of claim 6, wherein the two component carriers are all present at the first frequency band, respectively present at the first and second frequency bands, or all present at the second frequency band.

9. The method of claim 6, wherein upon using the first frequency band, the first baseband uses an oversampling and one Inverse High Fourier Transform (IFFT) to process a signal that the information related to the first baseband and the information related to the second baseband are combined,
    wherein upon using the second frequency band, IFFT blocks as many as the number of basebands are used to process information related to each baseband.

10. The method of claim 9, the IFFT blocks comprise a first IFFT block and a second IFFT block,
    wherein upon using the first frequency band, only the first IFFT block is used to process the signal that the information related to the first baseband and the information related to the second baseband are combined,
    wherein upon using the second frequency band, both the first and second IFFT blocks are used,
    wherein the first IFFT block is larger than the second IFFT block.

11. The method of claim 6, wherein when the first and second basebands are for carrier aggregations with the same RF characteristic, only the first IFFT block is used to perform an OFDM modulation.

12. A carrier aggregation apparatus in a wireless communication system comprising a controller,
    wherein the controller is configured to:
    use one baseband including two information and two radio frequency (RF) chains for aggregation of two component carriers at first and second frequency bands for each antenna port; and
    switch the one baseband to at least one RF chain corresponding to the component carrier characteristic of the two RF chains upon use of the first frequency band.

13. A carrier aggregation apparatus in a wireless communication system comprising a controller,
    wherein the controller is configured to:
    use a first baseband, a second baseband, a first radio frequency (RF) chain and a second RF chain for aggregation of two component carriers at first and second frequency bands for each antenna port; and
    switch one baseband including combined information of information related to the second frequency band and information related to the first baseband to at least one RF chain corresponding to the component carrier characteristic of the first and second RF chains.

14. A carrier aggregation method in a wireless communication system comprising:
    using a first baseband, a second baseband, a first radio frequency (RF) chain and a second RF chain for aggregation of two component carriers at first and second frequency bands for each antenna port;
    selecting the first frequency band or the second frequency band to transform a baseband architecture according to the selected frequency band;
    switching the transformed baseband to at least one RF chain corresponding to the component carrier characteristic of the first and second RF chains; and
    transmitting a signal through the switched at least one RF chain.

* * * * *